Patented Aug. 26, 1941

2,253,835

UNITED STATES PATENT OFFICE 2,253,835

REACTIVATION OF SPENT HYDROGENATION CATALYSTS

Victor E. Wellman, Silver Lake, Ohio, assignor to The B. F. Goodrich Company, New York, N. Y.

No Drawing. Application August 25, 1938, Serial No. 226,768

7 Claims. (Cl. 204—140)

The object of this invention is to provide a new method for the electrolytic reactivation of massive hydrogenation catalysts which does not require the complete removal of organic material from the catalyst by the use of solvent prior to electrolytic reactivation. By this new method reactivation is simpler and more effective than by previously described methods.

Prior to this invention it was customary to reactivate massive hydrogenation catalysts such as wire, turnings, chips, etc., of various metals such as nickel, copper, cobalt, iron, etc., or mixtures of such metals, by electrolyzing a mildly alkaline solution with the catalyst serving as the anode. The catalyst, supported in a suitable cage, was treated in a solution of sodium carbonate, or of calcium, strontium or barium hydroxide. If all organic matter had been removed from the catalyst surface by washing well with solvents, anodic oxidation of the metal proceeded to form a metallic oxide or peroxide on the surface. This so-formed oxide or peroxide was then reduced to highly active catalyst metal by heating in hydrogen at about 200° C. to 250° C. for a sufficient time. Failure to remove completely the organic material by means of a solvent wash resulted in the formation of a loosely adhering oxide or peroxide film when the catalyst was subsequently oxidized in mild alkaline electrolyte.

It has now been found possible to remove organic matter adhering to the catalyst by anodic oxidation and also to oxidize anodically the metal catalyst in the same solution. This process eliminates the necessity for expensive washing processes involving the use of organic solvents. Equipment to effect such washing processes and for solvent recovery is therefore not needed.

It has been found that mixed solutions containing at least 2% of alkali hydroxides together with alkali carbonates are suitable for carrying out the present invention. For example, a solution containing 3 to 6% sodium hydroxide and 1 to 3% sodium carbonate may be used effectively to carry out this two-purpose anodic oxidation. The use of sodium carbonate alone is not effective to bring about the formation of an adherent oxide or peroxide film on the surface of the massive metal unless organic matter is removed at the same time by strong electrolytic oxidation. A solution containing both hydroxide and carbonate permits both types of oxidation to occur.

A similar process employing solutions in a range of alkalinity of pH 11 to 13.5 is described and claimed in the copending application of Waldo L. Semon, Serial No. 225,196, filed August 16, 1938. At the higher alkalinities resulting from concentrations of alkali hydroxides herein set forth, the desired results cannot be attained unless both hydroxide and carbonate are present.

The following is a specific example of the operation: An electrolytic solution is made by dissolving about 520 grams of sodium hydroxide and about 170 grams of sodium carbonate in 13 litres of distilled water contained in a suitable shaped vessel. A sheet of nickel placed in the electrolytic solution serves as the cathode during the subsequent electrolysis. The massive nickel catalyst, contained in a suitable Monel wire basket or cage and surrounded by a cloth or canvas bag which serves as a diaphragm, is lowered into the solution and is oxidized anodically by the passage of a current of 0.05 ampere per square inch of catalyst surface, considering such surface to be the surface of a solid whose size and shape equal those of the cage containing the catalyst, and at a potential of 4 to 10 volts. Current is allowed to flow until the surface of the massive nickel catalyst and of the wire cage are covered with a tightly adhering film of nickel oxide or nickel peroxide. The catalyst cage may then be removed from the electrolytic solution and washed until substantially free of absorbed alkaline materials. It then is introduced into the hydrogenation vessel where the oxides on the surfaces of the nickel are reduced to the metal by heating in an atmosphere of hydrogen to 200° to 250° C. for about 1 to 2 hours. After such treatment the catalyst is found to be active for hydrogenation reactions.

The process of this invention may be used for the reactivation of any of the well known massive metal hydrogenation catalysts composed of such metals as copper, nickel or cobalt or alloys of these metals with each other or with other metals such as chromium, platinum, palladium, iron or aluminum, as well as mixtures of any of the above metals or alloys.

Although the invention has been described in considerable detail with regard to a preferred procedure and in reference to certain preferred materials and proportions, it is understood that considerable variation and modification therein is possible without departing from the spirit and scope of the inventions as defined in the appended claims.

I claim:

1. A process for reactivating spent massive metal hydrogenation catalysts contaminated with organic materials which comprises subjecting the spent catalyst to electrolytic anodic oxidation in an aqueous solution containing at least 2% alkali hydroxide together with at least 1% alkali carbonate, and having a pH above 13.5.

2. A process for reactivating spent massive metal hydrogenation catalysts contaminated with organic materials which comprises subjecting the spent catalyst to electrolytic anodic oxidation in an aqueous solution of at least 2% sodium hydroxide together with at least 1% sodium carbonate, and having a pH above 13.5.

3. A process for reactivating spent massive metal hydrogenation catalysts contaminated with organic materials which comprises subjecting the catalyst to electrolytic anodic oxidation in an aqueous solution whose sodium hydroxide concentration is 3% to 6% and whose sodium carbonate concentration is 1% to 3%, and which has a pH above 13.5.

4. A process for reactivating spent massive metal hydrogenation catalysts contaminated with organic materials which comprises subjecting the spent catalyst to electrolytic anodic oxidation in an aqueous solution whose sodium hydroxide concentration is 3% to 6% and whose sodium carbonate concentration is 1% to 3%, and which has a pH above 13.5, the electrolyzing current density being about 0.05 ampere per square inch at 4 to 10 volts, the current density being estimated by assuming the catalyst surface to be a solid surface having the same dimensions as the catalyst cage.

5. A process for reactivating spent massive nickel hydrogenation catalysts contaminated with organic materials which comprises subjecting the catalyst to electrolytic anodic oxidation in an aqueous solution whose sodium hydroxide concentration is 3% to 6% and whose sodium carbonate concentration is 1% to 3%, and which has a pH above 13.5, the electrolyzing current density being about 0.05 ampere per square decimeter at 4 to 10 volts, the density being estimated by assuming the catalyst surface to be a solid surface having the same dimensions as the catalyst cage.

6. The process of reactivating a spent massive metal hydrogenation catalyst contaminated with organic materials which comprises subjecting the spent catalyst to electrolytic anodic oxidation in an aqueous solution containing at least 2% alkali hydroxide together with at least 1% alkali carbonate, and which has a pH above 13.5, then reducing by heating in a hydrogen atmosphere.

7. The process of reactivating a spent massive nickel hydrogenation catalyst contaminated with organic materials which comprises subjecting the spent catalyst to electrolytic anodic oxidation in an aqueous solution containing at least 2% alkali hydroxide together with at least 1% alkali carbonate, and which has a pH above 13.5, and then reducing it by heating in a hydrogen atmosphere.

VICTOR E. WELLMAN.